(12) United States Patent
Chapman

(10) Patent No.: US 7,188,848 B2
(45) Date of Patent: Mar. 13, 2007

(54) ANTI-JACK-KNIFE TRAILER HITCH AND TRAILER

(76) Inventor: Charles D. Chapman, 41 Alleghany Manor Rd., Sparta, NC (US) 28675

( * ) Notice: Subject to any disclaimer, the term of this patent is extended or adjusted under 35 U.S.C. 154(b) by 0 days.

(21) Appl. No.: 10/897,143

(22) Filed: Jul. 22, 2004

(65) Prior Publication Data

US 2006/0017259 A1  Jan. 26, 2006

(51) Int. Cl.
*B62D 1/00* (2006.01)
(52) U.S. Cl. ............ 280/78; 280/491.3; 280/656; 224/519
(58) Field of Classification Search ............ 280/78, 280/491.3, 491.1, 656; 224/519
See application file for complete search history.

(56) References Cited

U.S. PATENT DOCUMENTS

| 2,009,548 | A | * | 7/1935 | Goin et al. .................. 280/78 |
| 4,269,428 | A | * | 5/1981 | Rexine ..................... 280/491.1 |
| 4,664,403 | A | * | 5/1987 | Livingston ................ 280/460.1 |
| 5,984,342 | A | * | 11/1999 | Ysker ......................... 280/492 |
| 6,234,512 | B1 | * | 5/2001 | Bettenhausen ........... 280/491.1 |
| 6,435,801 | B2 | * | 8/2002 | Talbott ....................... 414/462 |
| 6,626,449 | B2 | * | 9/2003 | Hazen ......................... 280/492 |
| 6,659,491 | B2 | * | 12/2003 | Green ...................... 280/423.1 |
| 2004/0012170 | A1 | * | 1/2004 | McCoy ....................... 280/495 |
| 2005/0184485 | A1 | * | 8/2005 | Timmermans .............. 280/656 |

* cited by examiner

*Primary Examiner*—Kevin Hurley
(74) *Attorney, Agent, or Firm*—Stoll Keenon Ogden, PLLC; David J. Clement; Mark A. Taylor

(57) ABSTRACT

A hitch assembly for mounting to a trailer to form an interface between the trailer and a towing vehicle, with the trailer having a trailer deck and at least one wheel for ground support, said hitch assembly including a generally horizontally oriented cross member; a first mount arrangement including a shaft projecting from the cross member for telescopic receipt in a corresponding hitch receiver associated with a towing vehicle to connect said hitch assembly to a towing vehicle; and a second mount arrangement including at least two bosses spaced a predetermined distance apart and fixed to the cross member, with the bosses being mountable to the trailer deck to connect said hitch assembly to the trailer.

19 Claims, 9 Drawing Sheets

US 7,188,848 B2

ANTI-JACK-KNIFE TRAILER HITCH AND TRAILER

BACKGROUND OF THE INVENTION

The present invention is related broadly to trailers for towing over land or highway, and, more particularly, to a trailer, preferably a single-wheel trailer and a hitch configured to resist "jack-knifing".

Small utility trailers are useful for assisting in yard work. They are useful for hauling rocks, mulch, implements or other items in an off-road setting when towed by a lawn tractor or an all-terrain vehicle (ATV). These utility trailers may have one wheel or two, with a single-wheel trailer being especially useful over certain terrain. Such trailers are also more economical than two-wheel trailers. The small trailers can also be towed by full size vehicles over highways and roads.

Such a trailer may include a solid or mesh deck surface having a perimeter defined by railing projecting upwardly from the deck. A dual-wheel trailer typically includes two wheels for ground support contact spaced a predetermined distanced apart along either edge of the trailer bed. A single-wheel trailer typically includes a single wheel on a caster for a 360 degree rotation mounted underneath the bed along a centerline thereof.

One of the unfortunate characteristics of a small utility trailer is its tendency to "jack-knife". The familiar jack-knife term when applied to tractors and trailers describes the situation wherein the trailer and tractor when viewed from above appear to fold up like a jack-knife. This typically results from a situation wherein the tractor is in reverse and the trailer veers away from the direction of travel and angularly approaches the towing vehicle as the towing vehicle moves in reverse. The problem is particularly acute with respect to a single-wheel trailer that requires 360 degree motion from the caster that attaches the wheel to the trailer.

Attempts have been made in the past to provide trailer hitches that resist jack-knifing. Most of these involve modification of the tow vehicle to accept two spaced-apart linkages with the trailer. Such modification of the towing vehicle may not be practical or desirable for every situation. Therefore, there exists a need for a trailer hitch, especially a trailer hitch operable with the single-wheel trailer that will resist jack-knifing and operate with a standard receiver hitch interface with the towing vehicle.

SUMMARY OF THE INVENTION

It is an object of the present invention to provide a trailer hitch assembly that resists jack-knifing and is usable with a standard square-channel receiver hitch.

It is another object of the present invention to provide such a hitch, or trailer and hitch combination, that allows the trailer to be folded vertically for storage when not in use.

To those ends, the present invention is directed to a hitch assembly for mounting to a trailer to form an interface between the trailer and a towing vehicle, with the trailer having a trailer deck and at least one wheel for ground support. The hitch assembly includes a generally horizontally oriented cross member; a first mount arrangement including a shaft projecting from the cross member for telescopic receipt in a corresponding hitch receiver associated with a towing vehicle to connect the hitch assembly to a towing vehicle; and a second mount arrangement including at least two bosses spaced a predetermined distance apart and fixed to the cross member, the bosses being mountable to the trailer deck to connect the hitch assembly to the trailer.

Preferably, the shaft projects in a first direction from the cross-member at approximately the center thereof and the bosses project from either end of the cross-member in a second direction.

It is preferred that the present invention further include at least two brackets for affixation to the trailer deck at positions corresponding to the bosses, the brackets being each formed with at least one opening therein and wherein the bosses are each formed with at least one opening therein for registry with a corresponding opening on a corresponding bracket, and the hitch assembly further includes at least two peg members for disposition in the openings in the brackets and the bosses for rotational motion of the bosses with respect to the brackets. Preferably, the pegs are formed as bolts mounted to the brackets using a bearing device providing lateral deflection of the bolt to allow movement of the bosses relative to the brackets.

It is further preferred that the brackets are formed with a plurality of vertically spaced openings to accommodate the peg members in a selective one of the vertically spaced openings to provide a user-selected height adjustment for the hitch assembly relative to the trailer deck. Preferably, the bosses are formed with a plurality of horizontally spaced openings to accommodate the peg members in a selective one of the horizontally spaced openings to provide a user-selected proximity adjustment for the hitch assembly relative to the trailer deck. Further, the brackets may be formed as generally vertically disposed plate members for mounting to the trailer in a manner extending between the trailer deck and a trailer rail member.

It is preferable that the present invention further include at least two brackets for affixation to the trailer deck at positions corresponding to the bosses, the brackets being each formed with at least two vertically spaced openings therein and wherein the bosses are each formed with at least two horizontally spaced openings therein for registry with corresponding openings on a corresponding bracket, the hitch assembly further comprising at least two first peg members for disposition in two of the openings in the brackets and the bosses when the trailer deck is in a first, horizontal position for ground engagement of the at least one wheel, and at least two second peg members for disposition in two other openings for locking the trailer in a second, vertical disposition for stowage, the trailer being thereby pivotable between the first and second dispositions.

Preferably, the bosses project from the cross-member in general alignment therewith, the hitch assembly further comprising at least two bracket members for attachment to a trailer, the bracket members each including an opening to accommodate a fastener, and a fastener assembly extending from the brackets to the bosses. It is preferred that the fastener assembly include an eyebolt attached to each of the bosses and projecting outwardly therefrom, and a bolt for engagement with an eye portion of the eyebolt and the brackets.

Preferably, the hitch assembly is pivotably mountable to the trailer and movable between a generally horizontal disposition with wheel to ground contact for trailer use and a generally vertical disposition for stowage.

It is preferable that the present invention further include a retaining member mountable to a towing vehicle for use in conjunction with the pivotably mountable hitch assembly to retain the trailer in the vertical disposition. The retaining member may be formed as a generally L-shaped member having an elongate portion for projecting vertically form the towing vehicle and a retainer portion extending laterally away from the elongate portion for engagement with the trailer to retain the trailer in the vertical disposition. It is preferred that the elongate portion of the retaining member includes a first portion and a second portion fitted telescopically within the first portion and a fastener to selectively retain the first portion in a fixed position with respect to the second portion.

One embodiment of the present invention may be described in greater detail as a hitch assembly for mounting to a trailer to form an interface between the trailer and a towing vehicle, with the trailer having a trailer deck and at least one wheel for ground support, with the hitch assembly including a generally horizontally oriented cross member; a first mount arrangement including a shaft projecting in a first direction from the cross-member at approximately the center thereof for telescopic receipt in a corresponding hitch receiver associated with a towing vehicle to connect the hitch assembly to a towing vehicle; a second mount arrangement including at least two bosses projecting from either end of the cross-member in a second direction, the bosses being mountable to the trailer deck to connect the hitch assembly to the trailer; at least two brackets formed as generally vertically disposed plate members for affixation to the trailer deck at positions corresponding to the bosses, the brackets being each being formed with at least two vertically spaced openings therein and wherein the bosses are formed with at least two horizontally spaced openings therein for registry with corresponding openings on a corresponding bracket; and at least two first peg members for disposition in two of the openings in the brackets and the bosses when the trailer deck is in a first, horizontal position for ground engagement of the at least one wheel, and at least two second peg members for disposition in two other openings for locking the trailer in a second, vertical disposition for stowage, the trailer being thereby pivotable between the first and second dispositions.

It is preferred that the brackets are formed with a plurality of vertically spaced openings to accommodate the peg members in a selective one of the vertically spaced openings to provide a user-selected height adjustment for the hitch assembly relative to the trailer deck. Preferably, the bosses are formed with a plurality of horizontally spaced openings to accommodate the peg members in a selective one of the horizontally spaced openings to provide a user-selected proximity adjustment for the hitch assembly relative to the trailer deck.

Another embodiment of the present invention may be discussed in greater detail as a hitch assembly for mounting to a trailer to form an interface between the trailer and a towing vehicle, with the trailer having a trailer deck and at least one wheel for ground support, with the hitch assembly including a generally horizontally oriented cross member; a first mount arrangement including a shaft projecting from the cross member for telescopic receipt in a corresponding hitch receiver associated with a towing vehicle to connect the hitch assembly to a towing vehicle; a second mount arrangement including at least two bosses projecting from the cross-member in general alignment therewith and spaced a predetermined distance apart and fixed to the cross member, the bosses being mountable to the trailer deck to connect the hitch assembly to the trailer; at least two bracket members for attachment to a trailer, the bracket members each including an opening to accommodate a fastener; and a fastener assembly extending from the brackets to the bosses and including an eyebolt attached to each of the bosses and projecting outwardly therefrom, and a bolt for engagement with an eye portion of the eyebolt and the brackets, wherein the hitch assembly is pivotably mountable to the trailer and movable between a generally horizontal disposition with wheel to ground contact for trailer use and a generally vertical disposition for stowage.

Preferably, the present invention further inlcudes a retaining member mountable to a towing vehicle for use in conjunction with the pivotably mountable hitch assembly to retain the trailer in the vertical disposition. Preferably, the retaining member is formed as a generally L-shaped member having an elongate portion for projecting vertically form the towing vehicle and a retainer portion extending laterally away from the elongate portion for engagement with the trailer to retain the trailer in the vertical disposition.

It is preferred that the elongate portion of the retaining member includes a first portion and a second portion fitted telescopically within the first portion and a fastener to selectively retain the first portion in a fixed position with respect to the second portion.

The present invention may be described in terms of a trailer having the unique hitch assembly described above. To that end, a trailer for towing behind a land vehicle, the trailer includes a trailer deck; at least one wheel mounted to the trailer deck for rolling ground support; and a hitch assembly forming an interface between the trailer and the towing vehicle. The hitch assembly includes a generally horizontally oriented cross member; a first mount arrangement including a shaft projecting from the cross member for telescopic receipt in a corresponding hitch receiver associated with a towing vehicle to connect the hitch assembly to the towing vehicle; and a second mount arrangement including at least two bosses spaced a predetermined distance apart and fixed to the cross member, the bosses being mountable to the trailer deck to connect the hitch assembly to the trailer. Preferably, the trailer includes a single wheel disposed generally along the centerline thereof on the underside of the trailer deck.

Preferably, the shaft projects in a first direction from the cross-member at approximately the center thereof and the bosses project from either end of the cross-member in a second direction. It is preferred that the present trailer include at least two brackets fixed to the trailer deck at positions corresponding to the bosses, the brackets being each formed with at least one opening therein and wherein the bosses are each formed with at least one opening therein for registry with a corresponding opening on a corresponding bracket, the hitch assembly further comprising at least two peg members for disposition in the openings in the brackets and the bosses for rotational motion of the bosses with respect to the brackets.

Preferably, the pegs are formed as bolts mounted to the brackets using a bearing device providing lateral deflection of the bolt to allow movement of the bosses relative to the brackets.

It is further preferred that the brackets are formed with a plurality of vertically spaced openings to accommodate the peg members in a selective one of the vertically spaced openings to provide a user-selected height adjustment for the hitch assembly relative to the trailer deck. Preferentially, the bosses are formed with a plurality of horizontally spaced openings to accommodate the peg members in a selective one of the horizontally spaced openings to provide a user-selected proximity adjustment for the hitch assembly relative to the trailer deck. Further, the brackets may be formed as generally vertically disposed plate members for mounting to the trailer in a manner extending between the trailer deck and a trailer rail member.

According to another preferred embodiment of the present invention, the trailer preferably includes at least two brackets fixed to the trailer deck at positions corresponding to the bosses, the brackets being each formed with at least two vertically spaced openings therein and wherein the bosses are each formed with at least two horizontally spaced openings therein for registry with corresponding openings on a corresponding bracket, the hitch assembly further comprising at least two first peg members for disposition in two of the openings in the brackets and the bosses when the trailer deck is in a first, horizontal position for ground engagement of the at least one wheel, and at least two second peg members for disposition in two other openings for locking the trailer in a second, vertical disposition for stowage, the trailer being thereby pivotable between the first and second dispositions.

Preferably, the bosses project from the cross-member in general alignment therewith, and the hitch assembly further includes at least two bracket members for attachment to a trailer, the bracket members each including an opening to accommodate a fastener, and a fastener assembly extending from the brackets to the bosses. The fastener assembly may include an eyebolt attached to each of the bosses and projecting outwardly therefrom, and a bolt for engagement with an eye portion of the eyebolt and the brackets.

Preferably, the hitch assembly is pivotably mountable to the trailer and movable between a generally horizontal disposition with wheel to ground contact for trailer use and a generally vertical disposition for stowage. To assist in that operation, the present invention preferably includes a retaining member mountable to a towing vehicle for use in conjunction with the pivotably mountable hitch assembly to retain the trailer in the vertical disposition.

Preferably, the retaining member is formed as a generally L-shaped member having an elongate portion for projecting vertically form the towing vehicle and a retainer portion extending laterally away from the elongate portion for engagement with the trailer to retain the trailer in the vertical disposition. It is preferred that the elongate portion of the retaining member includes a first portion and a second portion fitted telescopically within the first portion and a fastener to selectively retain the first portion in a fixed position with respect to the second portion.

One embodiment of the present trailer can be described in greater detail as a trailer for towing behind a land vehicle, the trailer including a trailer deck; at least one wheel mounted to the trailer deck for rolling ground support; and a hitch assembly forming an interface between the trailer and the towing vehicle. The hitch assembly includes a generally horizontally oriented cross member; a first mount arrangement including a shaft projecting in a first direction from the cross-member at approximately the center thereof for telescopic receipt in a corresponding hitch receiver associated with a towing vehicle to connect the hitch assembly to a towing vehicle; a second mount arrangement including at least two bosses projecting from either end of the cross-member in a second direction, the bosses being mountable to the trailer deck to connect the hitch assembly to the trailer; at least two brackets formed as generally vertically disposed plate members for affixation to the trailer deck at positions corresponding to the bosses, the brackets being each being formed with at least two vertically spaced openings therein and wherein the bosses are formed with at least two horizontally spaced openings therein for registry with corresponding openings on a corresponding bracket; and at least two first peg members for disposition in two of the openings in the brackets and the bosses when the trailer deck is in a first, horizontal position for ground engagement of the at least one wheel, and at least two second peg members for disposition in two other openings for locking the trailer in a second, vertical disposition for stowage, the trailer being thereby pivotable between the first and second dispositions.

It is preferred that the trailer include a single wheel disposed generally along the centerline thereof on the underside of the trailer deck.

It is further preferred that the brackets are formed with a plurality of vertically spaced openings to accommodate the peg members in a selective one of the vertically spaced openings to provide a user-selected height adjustment for the hitch assembly relative to the trailer deck. Preferably, the bosses are formed with a plurality of horizontally spaced openings to accommodate the peg members in a selective one of the horizontally spaced openings to provide a user-selected proximity adjustment for the hitch assembly relative to the trailer deck.

Another embodiment of the present trailer can be described as a trailer for towing behind a land vehicle, the trailer including a trailer deck; at least one wheel mounted to the trailer deck for rolling ground support; and a hitch assembly forming an interface between the trailer and the towing vehicle. The hitch assembly includes a generally horizontally oriented cross member; a first mount arrangement including a shaft projecting from the cross member for telescopic receipt in a corresponding hitch receiver associated with a towing vehicle to connect the hitch assembly to a towing vehicle; a second mount arrangement including at least two bosses projecting from the cross-member in general alignment therewith and spaced a predetermined distance apart and fixed to the cross member, the bosses being mountable to the trailer deck to connect the hitch assembly to the trailer; at least two bracket members for attachment to a trailer, the bracket members each including an opening to accommodate a fastener; and a fastener assembly extending from the brackets to the bosses and including an eyebolt attached to each of the bosses and projecting outwardly therefrom, and a bolt for engagement with an eye portion of the eyebolt and the brackets, wherein the hitch assembly is pivotably mountable to the trailer and movable between a generally horizontal disposition with wheel to ground contact for trailer use and a generally vertical disposition for stowage.

It is preferred that the trailer includes a single wheel disposed generally along the centerline thereof on the underside of the trailer deck.

Preferably, the present invention further includes a retaining member mountable to a towing vehicle for use in conjunction with the pivotably mountable hitch assembly to retain the trailer in the vertical disposition. It is preferred that the retaining member be formed as a generally L-shaped member having an elongate portion for projecting vertically form the towing vehicle and a retainer portion extending laterally away from the elongate portion for engagement with the trailer to retain the trailer in the vertical disposition. Preferably, the elongate portion of the retaining member includes a first portion and a second portion fitted telescopically within the first portion and a fastener to selectively retain the first portion in a fixed position with respect to the second portion.

DESCRIPTION OF THE PREFERRED EMBODIMENT

Figure 1:
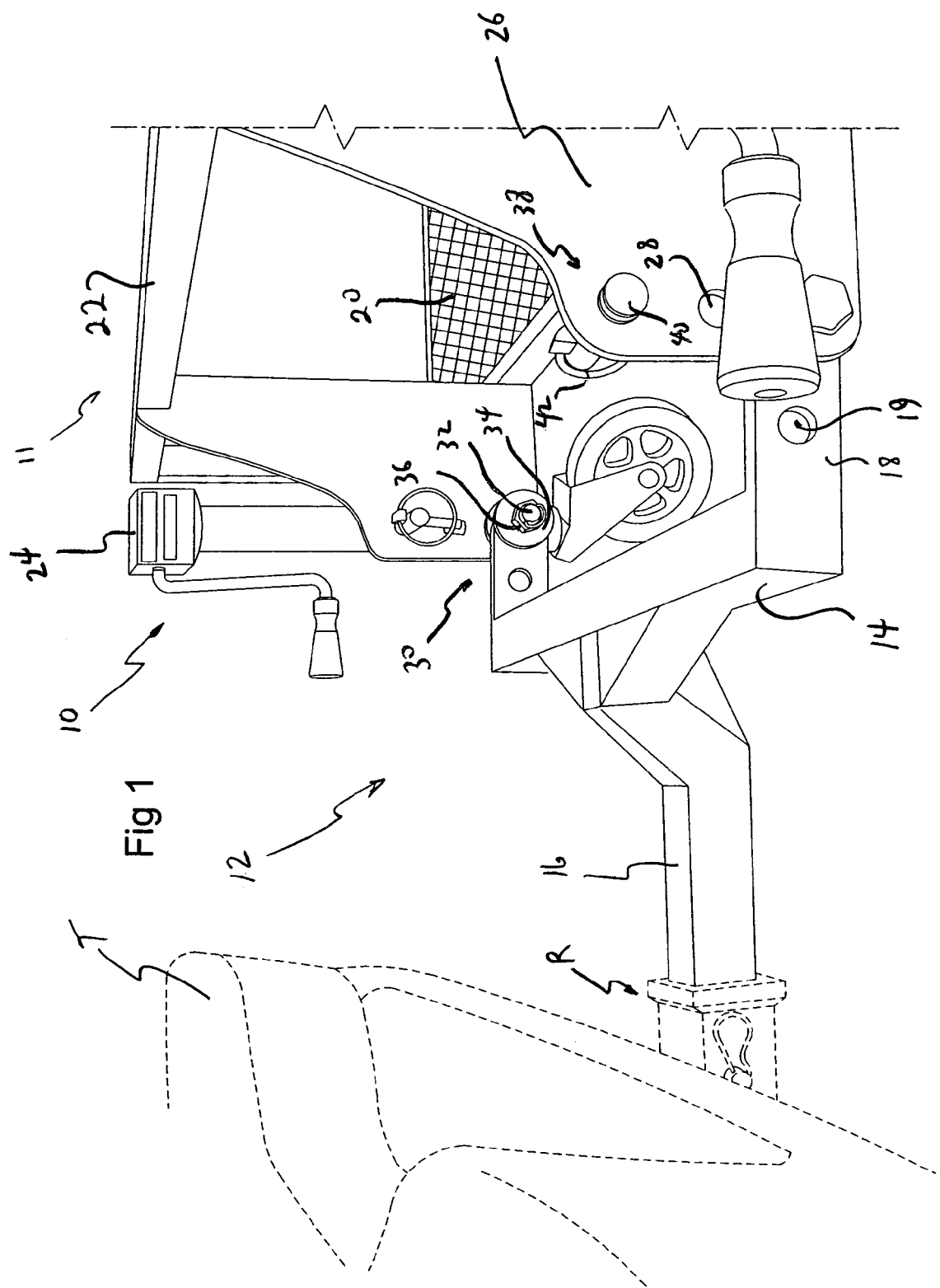
FIG. 1 is a perspective view of a trailer hitch assembly according to a first preferred embodiment of the present invention.

Turning now to the drawings and, more particularly, to FIG. 1, a first preferred embodiment of the trailer hitch and trailer of the present invention is illustrated generally at 10 and includes a trailer 11 and a hitch assembly 12. It should be noted at the outset that the present invention exists in the form of a trailer hitch in combination with a single or dual wheel trailer and in the trailer hitch itself. Other than the hitch assembly and the mounting system therefor, the trailer 11 is conventional. The trailer 11 may also include a pair of jack stands 24 which provide ground support for the trailer if it is not attached to a towing vehicle T.

Figure 3:
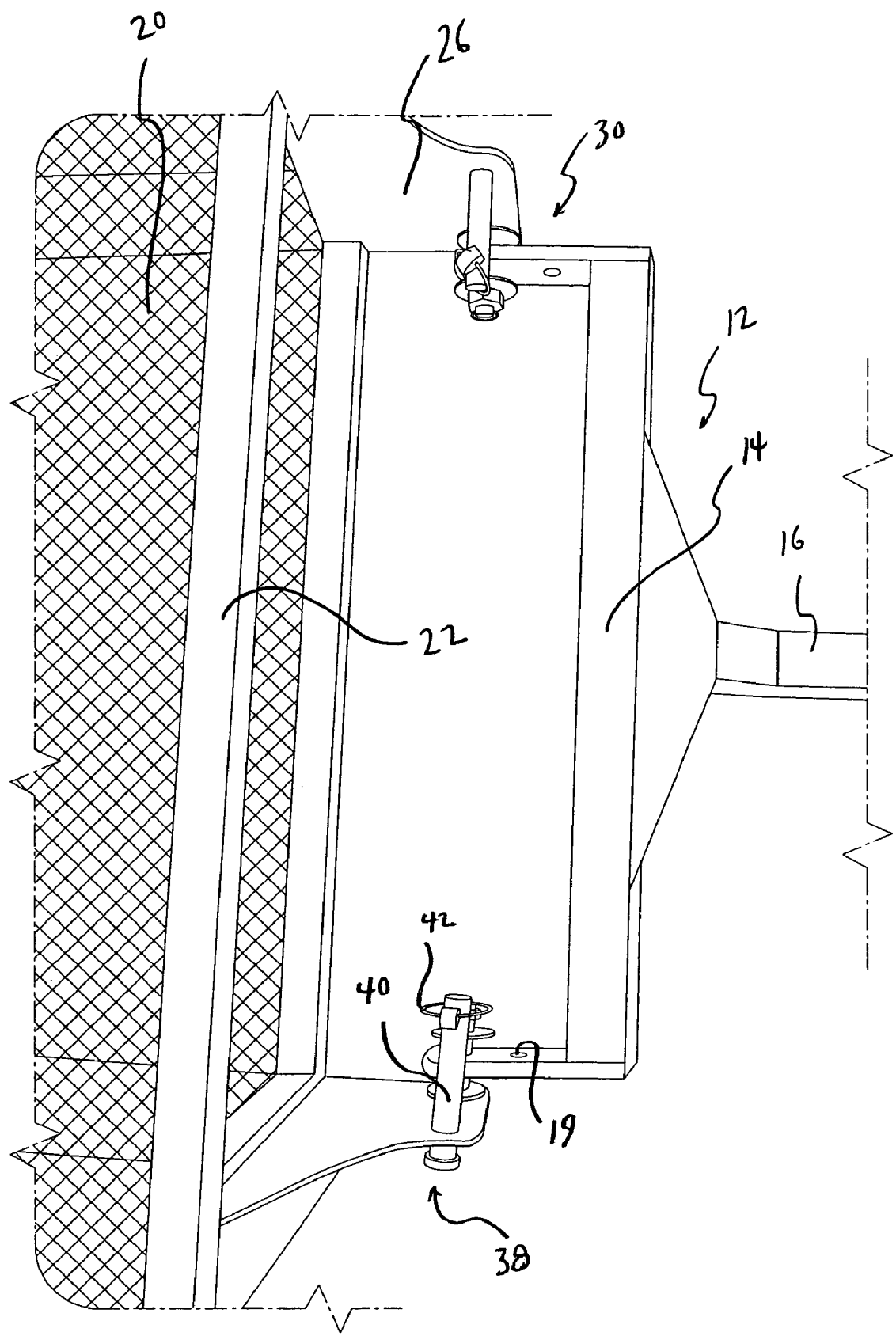
FIG. 3 is a top plan view of the hitch assembly illustrated in FIG. 1.
Figure 4:
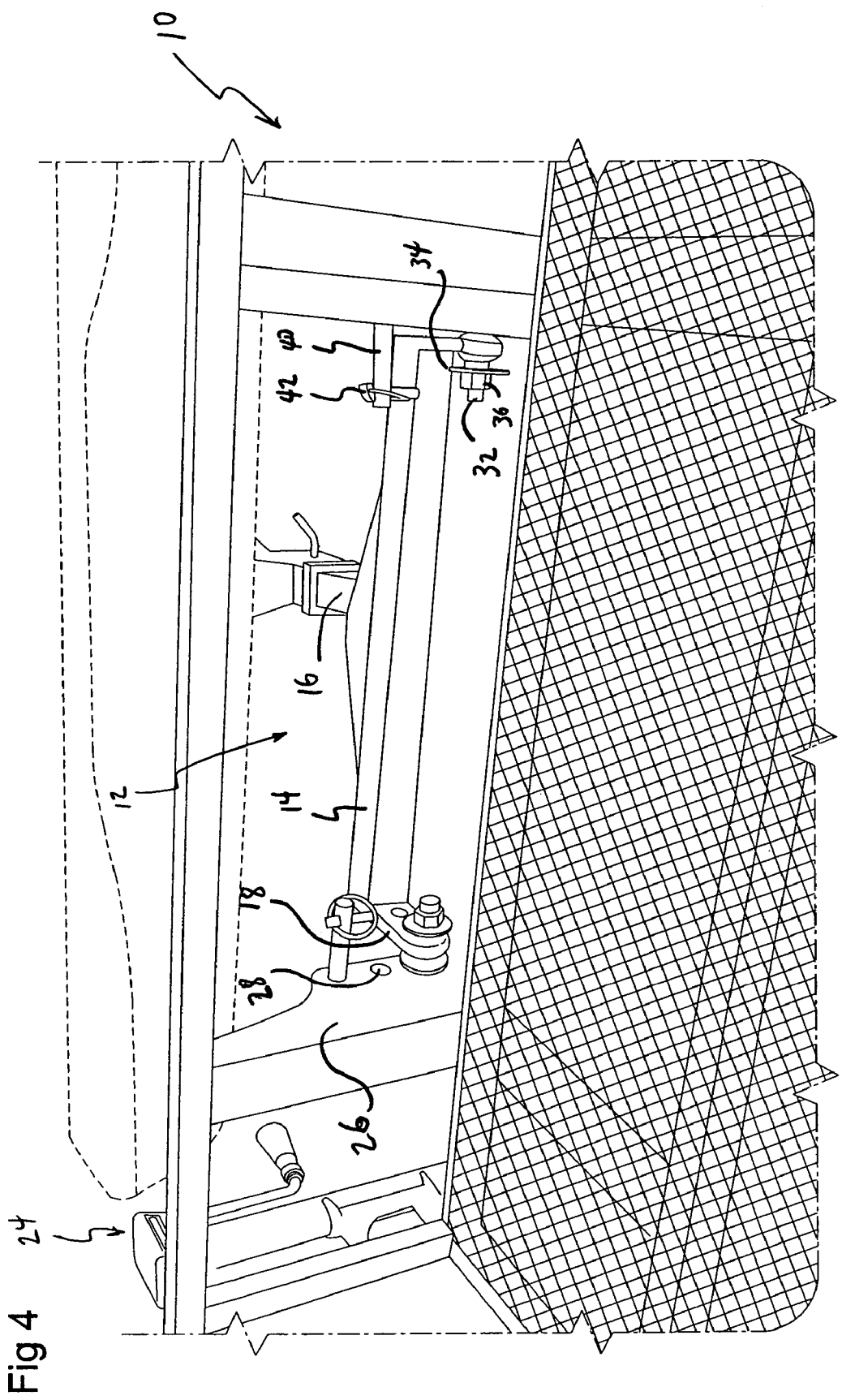
FIG. 4 is a rear view of the hitch assembly illustrated in FIG. 1.
Figure 5:
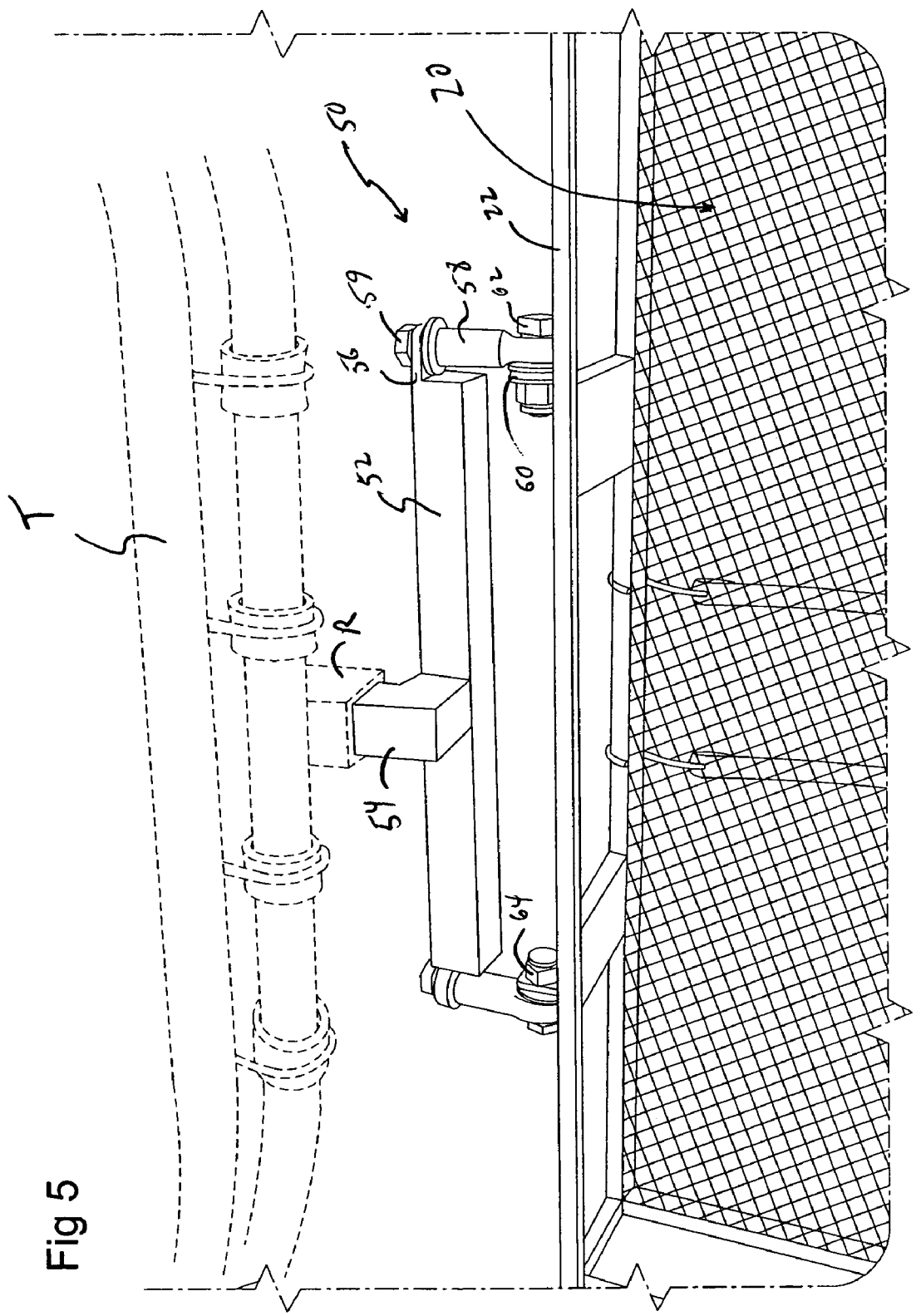
FIG. 5 is a top perspective view of a hitch assembly according to a second preferred embodiment of the present invention.
Figure 6:
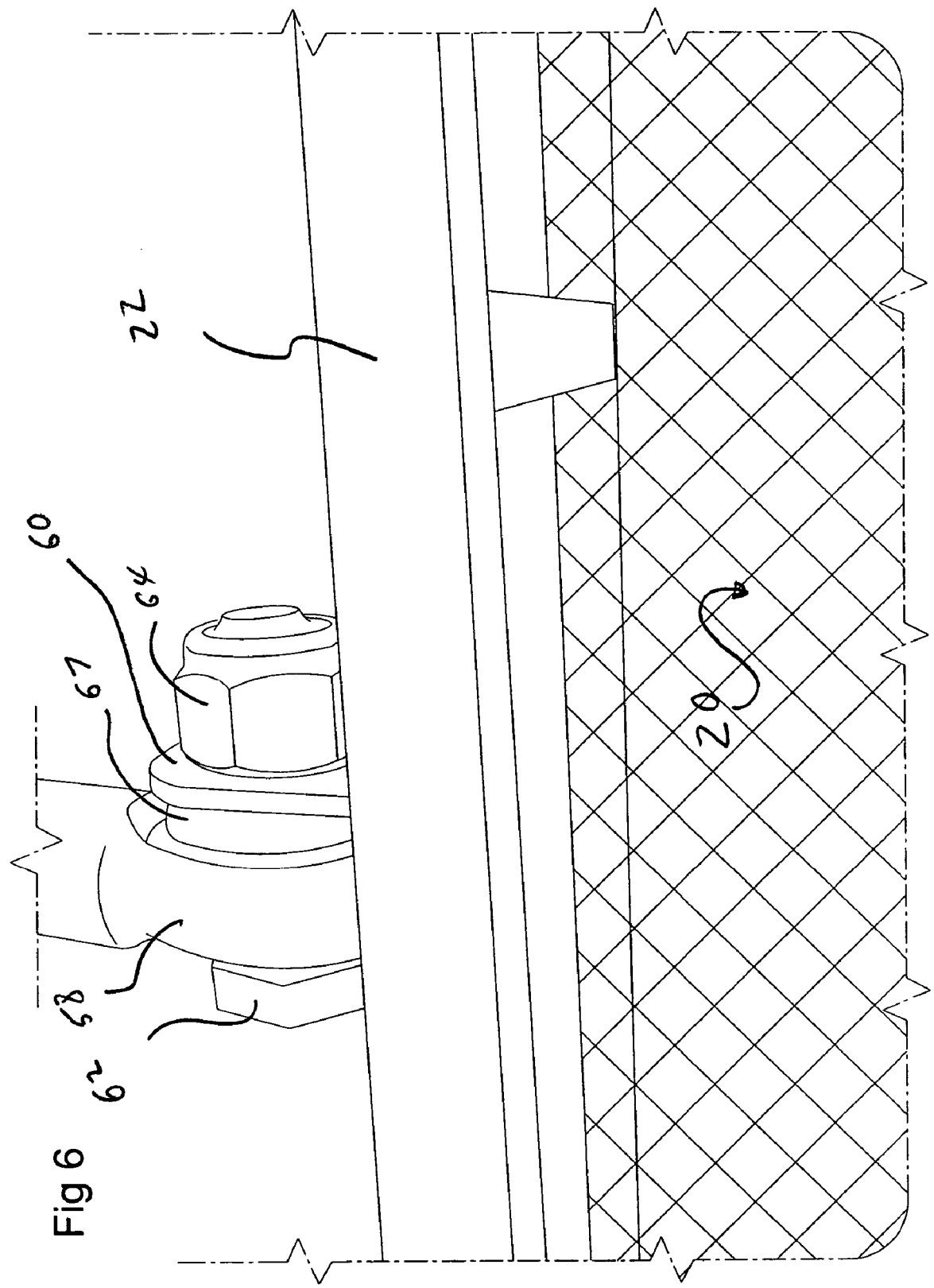
FIG. 6 is a perspective view of a fastener assembly associated with the hitch assembly illustrated in FIG. 5.

A first preferred embodiment of the hitch assembly is illustrated in FIGS. 1 through 4, while a second preferred embodiment is illustrated in FIGS. 5 and 6. Certain distinctions between the versions will become apparent hereinafter. It will also be seen that the hitch assembly is useful for connecting the trailer to either an over-the-road towing vehicle such as a truck or car and to an off-road vehicle such as an all terrain vehicle (ATV) or even a snowmobile. One feature of the present invention is that it can mate to a conventional receiver hitch without using a ball. This makes a rigid connection and when using the single-wheel caster trailer offers unparallel stability for that configuration.

Figure 7:
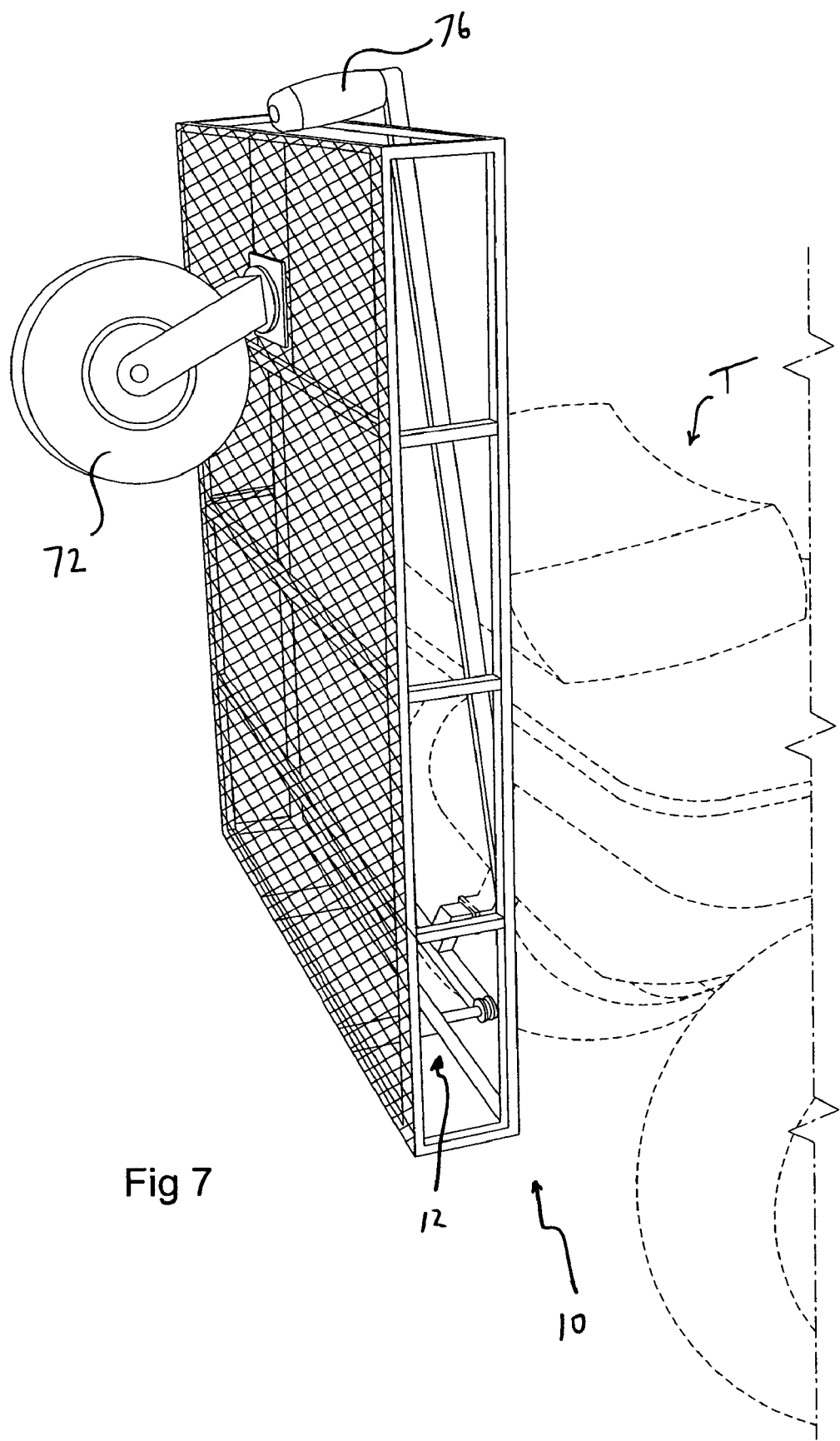
FIG. 7 is a side view of a trailer and hitch assembly with the trailer in a vertical, stowed position.
Figure 8:
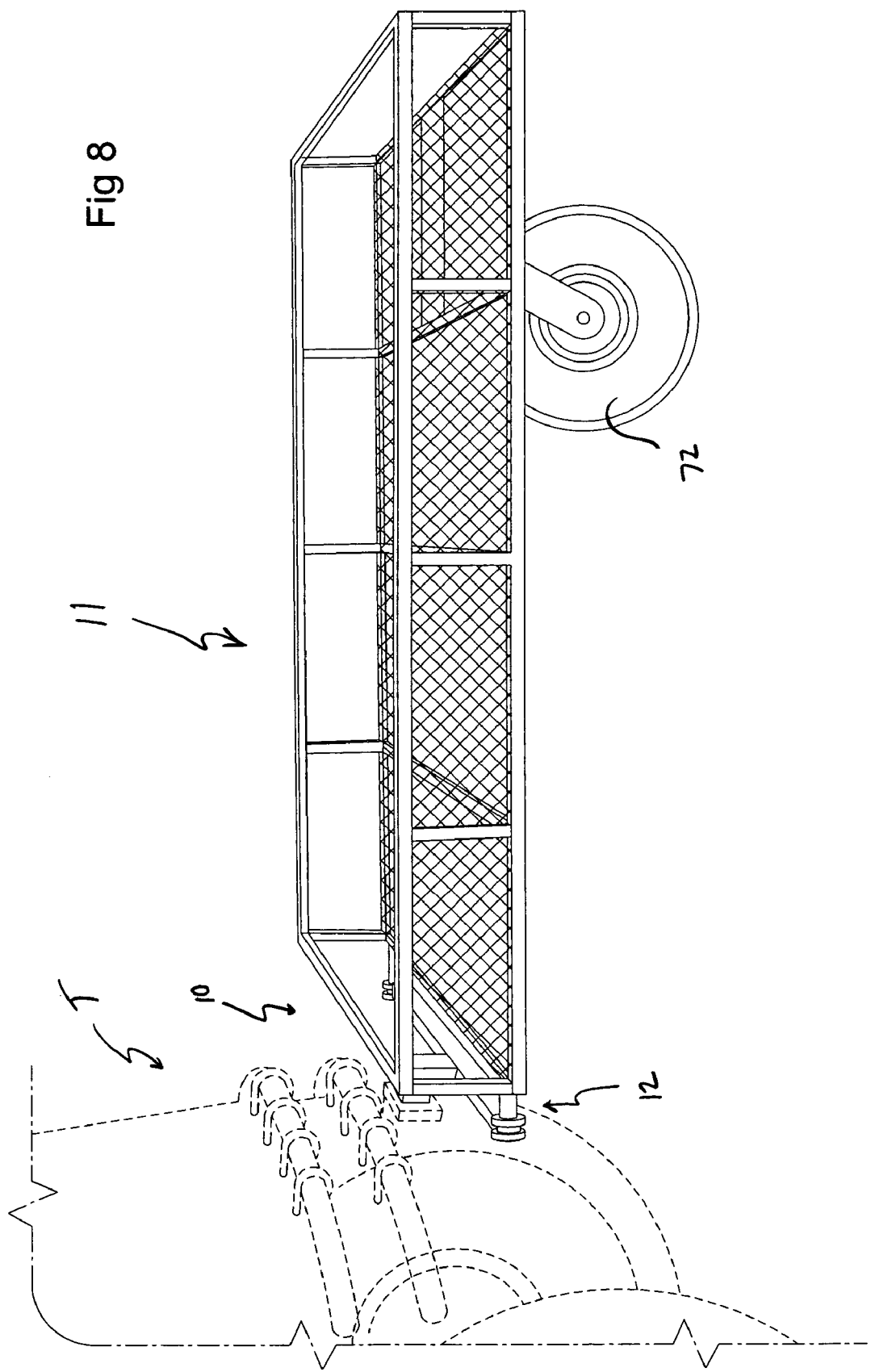
FIG. 8 is a side view of a trailer and hitch assembly according to the present invention with the trailer in a lowered position for use.

Turning briefly to FIGS. 7 and 8, the trailer associated with the present invention is typically a flatbed trailer having a mesh deck 20 and a perimeter defined by side rails 22 that extend upwardly from the deck 20. A single wheel 72 is mounted to the underside of the trailer deck 20 using a caster 74 to provide 360 degree rotational motion about a vertical axis. The wheel 72 is attached to the caster 74. It should be noted that the wheel 20 is in actuality a wheel and tire assembly with a pneumatic tire providing a smooth ride for the trailer. The term "wheel" is used herein for brevity and clarity. The hitch assembly 12 is located at the end of the trailer farthest from the wheel 72.

With reference now to FIG. 1, the hitch assembly 12 includes a cross-member 14 extending in a generally parallel, spaced relationship with the trailer deck 20. The cross member 14 may be formed from steel having a generally square cross section or from any other suitable material. A square shaft 16 projects outwardly from the cross member 14 for telescopic receipt by a conventional receiver hitch R on a towing vehicle T. As seen in FIG. 1, there is an angular step down to the shaft 16 to accommodate the positioning of the trailer and the towing vehicle for on-road use. As will be seen with a second preferred embodiment, and with reference to FIG. 5, the shaft may also step up for receipt by a receiver hitch R on an ATV. It should be noted that the step down or step up is not dependent on the type of vehicle involved, i.e., whether on-road or off-road, but rather on the specific vehicle involved in order to maintain a level trailer deck while towing.

Two bosses 18 extend from either end of the cross member 14 in a direction oppositely from the shaft 16 and directed back toward the trailer 11. The bosses are generally flat members having openings 19 formed therein for mounting to the trailer. Two brackets, formed as flat mounting plates 26 are mounted to the trailer 11 and extend from the deck 20 to a rail 22 to provide a stable mounting platform for the hitch assembly 12. Openings 28 are formed in the plates 26 for mounting the hitch assembly 12 thereto and, as will be seen, supporting the hitch assembly 12 in a vertical, stowed position.

Figure 2:
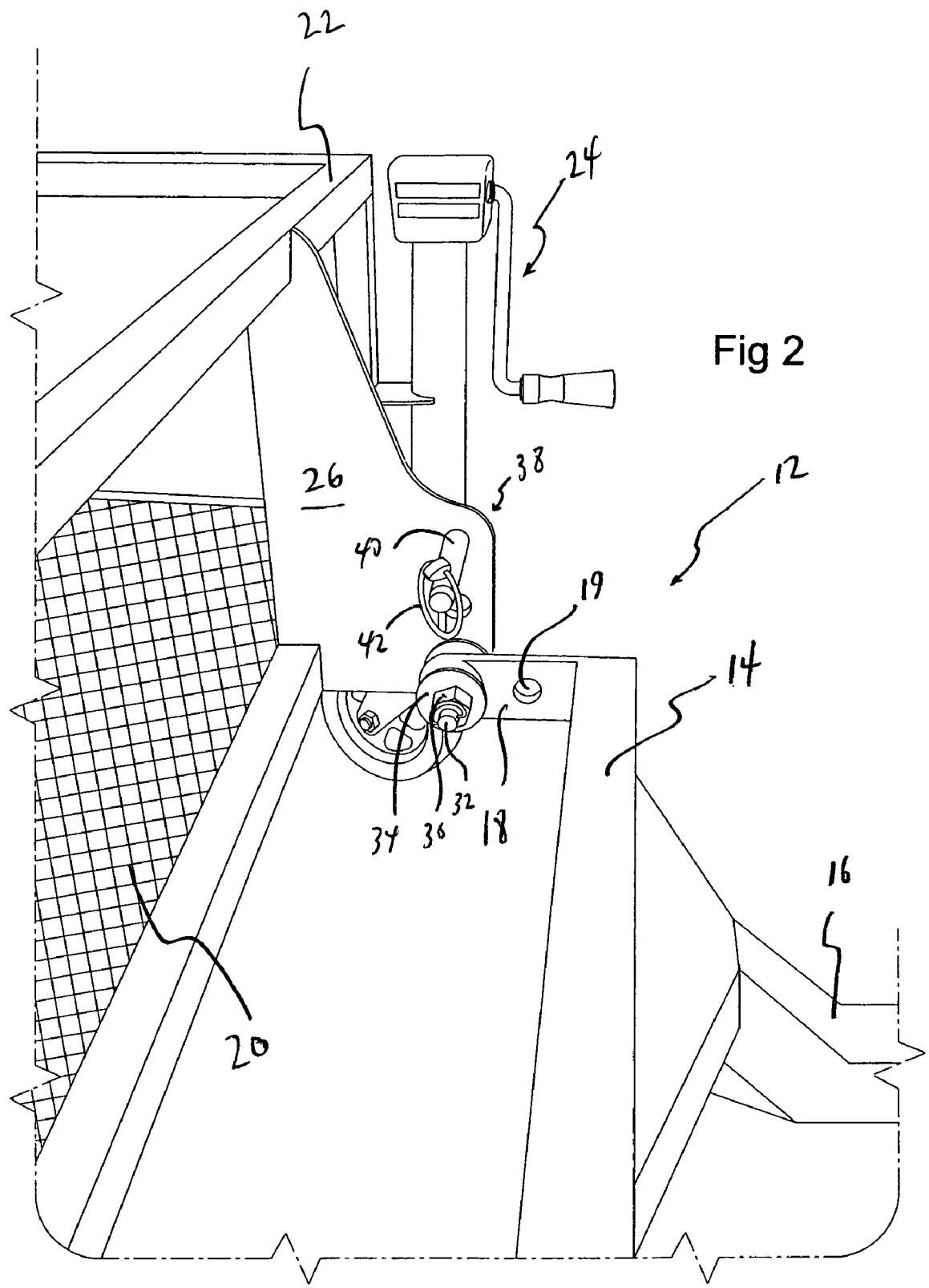
FIG. 2 is a partial view of the hitch assembly illustrated in FIG. 1.

With reference to FIGS. 2–4, the bosses 18 are mounted to the plates 26 using bolts so that the bosses 18 can pivot. One of the openings 19 is in registry with one of the openings 28 in a corresponding mounting plate 26 and a fastener assembly 30 maintains hitch assembly 12 mounted to the plates 26.

The fastener assembly 30 includes a peg member that may be formed as a bolt 32 that passes through respective openings 19 and 28 in the bosses 18 and plate 26 and is fitted thereto using washers 34 and a nut 36. As will be seen in greater detail hereinafter, a bearing may be used to allow some motion of the bosses relative to the plates beyond the natural pivoting motion. This allows for movement of the hitch assembly 12 relative to the trailer 11 to thereby prevent mechanical distortion of the plates due to twisting action of the bosses 18.

In order to stow an unused trailer in a vertical position as seen in FIG. 7, more openings 19, 28 are provided on the bosses 18 and plates 26 respectively. FIG. 1–4 shows the trailer and hitch assembly 10 in a ground contact orientation for use. If the trailer is to be stowed in a vertical position as seen in FIG. 7, the user can rotate the trailer through a 90 degree arc to where the trailer deck 20 is in a vertical orientation and the openings 19, 28 in the bosses 18 and plates 26, respectively are in registry. A second fastener assembly 38 includes a pin 40 which is passed through the openings 19, 28 and held in place with a locking ring 42. In this manner, the trailer is locked in a vertical position which will be explained in greater detail presently.

Turning now to FIGS. 5 and 6, a second preferred embodiment of the hitch assembly is illustrated. As seen in FIG. 5, a cross member 52 is positioned similarly to the earlier cross member 14 and a shaft 54 projects normally away from the cross member 52 at approximately the center thereof for telescopic receipt in a receiver hitch R carried by a towing vehicle T. FIG. 5 illustrates a step up for the shaft 54 to accommodate the ATV-type towing vehicle. Two flanges 56 project from either end of the cross member 52 in a generally parallel manner and have openings (not shown) formed therein. An eyebolt 58 includes a threaded end projecting through the openings in the flanges 56 and is fixed thereto using a nut 59. Two flanges 60 project outwardly from the trailer deck 20 and includes openings therein (not shown) which are placed in registry with the openings in the eyebolt 50 and a mounting bolt 62 is passed through both openings and held in place using a nut 64.

As seen in FIG. 6, a bearing 67 is fitted in the eye of the eyebolt 58 to allow some "slop" or play in the relationship between the mounting bolt 62 and the eyebolt 58 so that any torsion or twisting movements of the hitch 50 can be dissipated without tearing the hitch 50 loose from the trailer.

Figure 9:
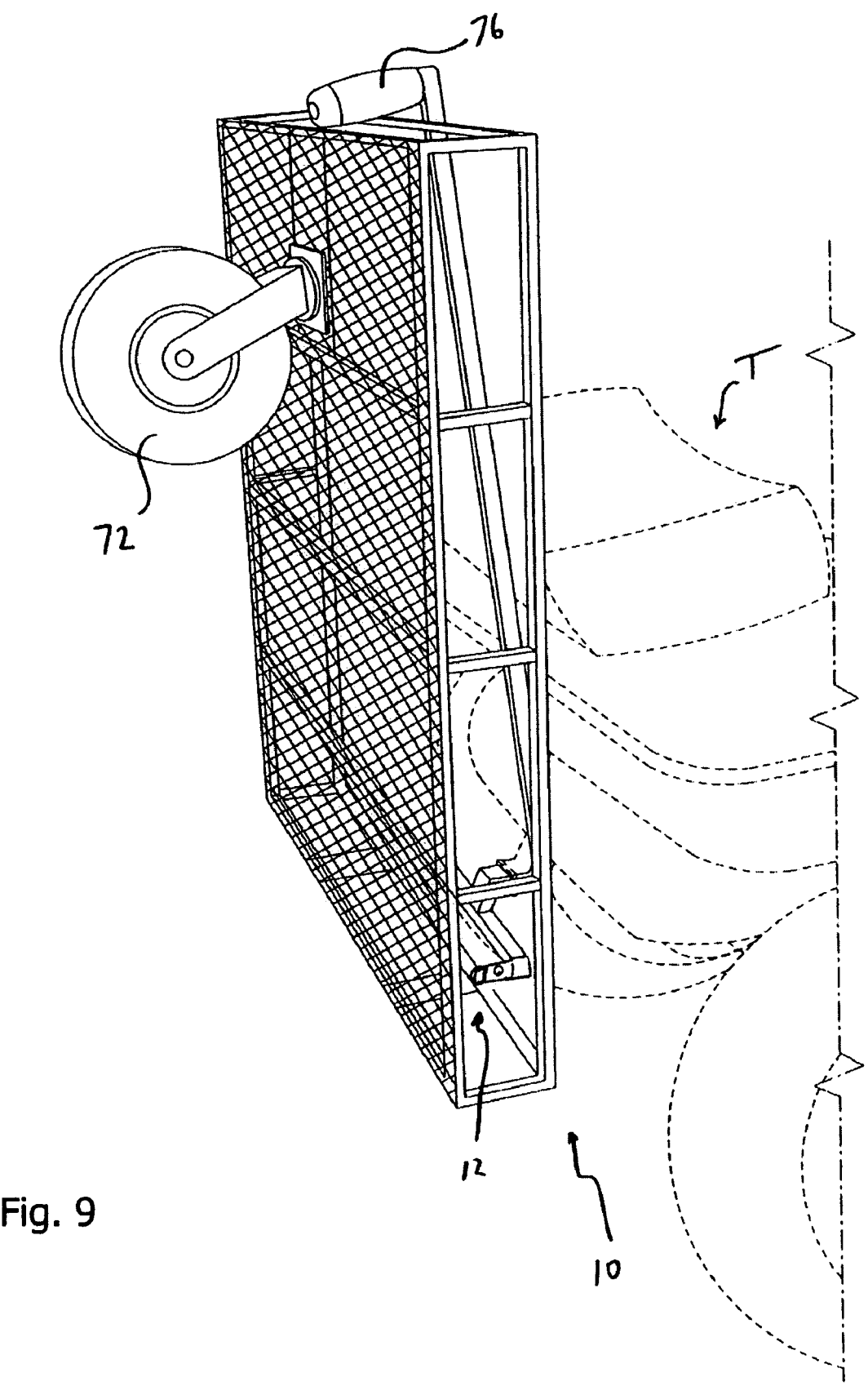
FIG. 9 is a side view of a trailer and hitch assembly with the trailer in a vertical, stowed position. according to another preferred embodiment of the present invention.

In operation, and with reference to FIGS. 7, 8, and 9, the hitch 12, 50 is shown fixed to a trailer 11 with the shaft 54 telescopically received by a receiver hitch R. FIGS. 7 and 9 illlustrate the second way in which the trailer may be held in a vertically oriented relationship. A hold down bar, or retaining member 76 that is formed as a generally L-shaped member that is inverted when in use, telescopes into another portion of itself is mounted to the towing vehicle T and when the trailer 11 is rotated about the mounting bolts 62 and the eyebolts 58 to a vertical position, the hold down bar 76 may be lowered onto the rear portion of the trailer and clamped in place to hold the trailer in a vertical relationship. For use, the hold down bar 76 is removed or moved from its hold down position and the trailer rotated about the hold down bolts 60 to a horizontal position as seen in FIG. 8. As can be seen, neither version of the hitch rigidly holds the trailer in a vertical relationship providing movement to allow the trailer some vertical motion as it passes over a rough surface. This prevents the trailer from putting unnecessary strain on the rigidly mounted components.

By providing a single rigid mounting point for the shaft 16, 54 into the receiving hitch R and by providing two parallel mounting arrangements that prevents side to side pivotal motion, the trailer illustrated in FIGS. 1–8 is incapable of jack-knifing. The present hitch allows the trailer to "wallow" or move vertically but prevents any side-to-side motion that may compromise a relationship between the towing vehicle and the trailer.

It will therefore be readily understood by those persons skilled in the art that the present invention is susceptible of a broad utility and application. While the present invention is described in all currently foreseeable embodiments, there may be other, unforeseeable embodiments and adaptations of the present invention, as well as variations, modifications and equivalent arrangements, that do not depart from the substance or scope of the present invention. The foregoing disclosure is not intended or to be construed to limit the present invention or otherwise to exclude such other embodiments, adaptations, variations, modifications and equivalent arrangements, the present invention being limited only by the claims appended hereto and the equivalents thereof.

I claim:

1. A hitch assembly for mounting to a trailer to form an interface between the trailer and a towing vehicle, with the trailer having a trailer deck and at least one wheel for ground support, said hitch assembly comprising:
    a generally horizontally oriented cross member;
    a first mount arrangement including a shaft projecting in a first direction from said cross-member at approximately the center thereof for telescopic receipt in a corresponding hitch receiver associated with a towing vehicle to connect said hitch assembly to a towing vehicle;
    a second mount arrangement including at least two bosses projecting from either end of said cross-member in a second direction, said bosses being mountable to the trailer deck to connect said hitch assembly to the trailer;
    at least two brackets formed as generally vertically disposed plate members for affixation to the trailer deck at positions corresponding to said bosses, said brackets being each being formed with at least two vertically spaced openings therein and wherein said bosses are formed with at least two horizontally spaced openings therein for registry with corresponding openings on a corresponding bracket; and
    at least two first peg members for disposition in two of said openings in said brackets and said bosses when the trailer deck is in a first, horizontal position for ground engagement of said at least one wheel, and at least two second peg members for disposition in two other openings for locking the trailer in a second, vertical disposition for stowage, said trailer being thereby pivotable between said first and second dispositions.

2. A hitch assembly according to claim 1 wherein said brackets are formed with a plurality of vertically spaced openings to accommodate said peg members in a selective one of said vertically spaced openings to provide a user-selected height adjustment for said hitch assembly relative to the trailer deck.

3. A hitch assembly according to claim 2 wherein said bosses are formed with a plurality of horizontally spaced openings to accommodate said peg members in a selective one of said horizontally spaced openings to provide a user-selected proximity adjustment for said hitch assembly relative to the trailer deck.

4. A hitch assembly according to claim 1 and further comprising a retaining member pivotably mounted to a towing vehicle for use in conjunction with said pivotably mounted hitch assembly for frictional engagement with a trailer portion to retain the trailer in said vertical disposition.

5. A hitch assembly according to claim 4 wherein said retaining member is formed as a generally L-shaped member having an elongate portion for projecting vertically from the towing vehicle and a retainer portion extending laterally away from said elongate portion for engagement with the trailer to retain the trailer in said vertical disposition.

6. A trailer for towing behind a land vehicle, said trailer comprising:
    a trailer deck;
    at least one wheel mounted to said trailer deck for rolling ground support; and
    a hitch assembly forming an interface between the trailer and the towing vehicle, said hitch assembly including:
    a generally horizontally oriented cross member;
    a first mount arrangement including a shaft projecting from said cross member for telescopic receipt in a corresponding hitch receiver associated with a towing vehicle to connect said hitch assembly to the towing vehicle; and
    a second mount arrangement including at least two bosses spaced a predetermined distance apart and fixed to said cross member, said bosses being mountable to the trailer deck to connect said hitch assembly to the trailer.

7. A trailer according to claim 6 wherein said trailer includes a single wheel disposed generally along the centerline thereof on the underside of said trailer deck.

8. A trailer according to claim 6 wherein said shaft projects in a first direction from said cross-member at approximately the center thereof and said bosses project from either end of said cross-member in a second direction.

9. A trailer according to claim 8 and further comprising at least two brackets for affixation to the trailer deck at positions corresponding to said bosses, said brackets being each formed with at least one opening therein and wherein said bosses are each formed with at least one opening therein for registry with a corresponding opening on a corresponding bracket, said hitch assembly further comprising at least two peg members for disposition in said openings in said brackets and said bosses for rotational motion of said bosses with respect to said brackets.

10. A trailer according to claim 9 wherein said peg members are formed as bolts mounted to said brackets using a bearing device providing lateral deflection of said bolt to allow movement of said bosses relative to said brackets.

11. A trailer according to claim 9 wherein said brackets are formed with a plurality of vertically spaced openings to accommodate said peg members in a selective one of said vertically spaced openings to provide a user-selected height adjustment for said hitch assembly relative to the trailer deck.

12. A trailer according to claim 9 wherein said bosses are formed with a plurality of horizontally spaced openings to accommodate said peg members in a selective one of said horizontally spaced openings to provide a user-selected proximity adjustment for said hitch assembly relative to the trailer deck.

13. A trailer according to claim 8 wherein said plate members are for mounting to the trailer in a manner extending between the trailer deck and a trailer rail member.

14. A trailer according to claim 6 and further comprising at least two brackets for affixation to the trailer deck at positions corresponding to said bosses, said brackets being each formed with at least two vertically spaced openings therein and wherein said bosses are each formed with at least two horizontally spaced openings therein for registry with corresponding openings on a corresponding bracket, said hitch assembly further comprising at least two first peg members for disposition in two of said openings in said brackets and said bosses when the trailer deck is in a first, horizontal position for ground engagement of said at least one wheel, and at least two second peg members for disposition in two other openings for locking the trailer in a second, vertical disposition for stowage, said trailer being thereby pivotable between said first and second dispositions.

15. A trailer according to claim 8 and wherein said bosses project from said cross-member in general alignment therewith, said hitch assembly further comprising at least two bracket members for attachment to a trailer, said bracket members each including an opening to accommodate a fastener, and a fastener assembly extending from said brackets to said bosses.

16. A trailer for towing behind a land vehicle, said trailer comprising:
a trailer deck;
at least one wheel mounted to said trailer deck for rolling ground support; and
a hitch assembly forming an interface between the trailer and the towing vehicle, said hitch assembly including:
a generally horizontally oriented cross member;
a first mount arrangement including a shaft projecting in a first direction from said cross-member at approximately the center thereof for telescopic receipt in a corresponding hitch receiver associated with a towing vehicle to connect said hitch assembly to a towing vehicle;
a second mount arrangement including at least two bosses projecting from either end of said cross-member in a second direction, said bosses being mountable to the trailer deck to connect said hitch assembly to the trailer;
at least two brackets formed as generally vertically disposed plate members for affixation to the trailer deck at positions corresponding to said bosses, said brackets being each being formed with at least two vertically spaced openings therein and wherein said bosses are formed with at least two horizontally spaced openings therein for registry with corresponding openings on a corresponding bracket; and
at least two first peg members for disposition in two of said openings in said brackets and said bosses when the trailer deck is in a first, horizontal position for ground engagement of said at least one wheel, and at least two second peg members for disposition in two other openings for locking the trailer in a second, vertical disposition for stowage, said trailer being thereby pivotable between said first and second dispositions.

17. A trailer according to claim 16 wherein said trailer includes a single wheel disposed generally along the centerline thereof on the underside of said trailer deck.

18. A trailer according to claim 16 wherein said brackets are formed with a plurality of vertically spaced openings to accommodate said peg members in a selective one of said vertically spaced openings to provide a user-selected height adjustment for said hitch assembly relative to the trailer deck.

19. A trailer according to claim 18 wherein said bosses are formed with a plurality of horizontally spaced openings to accommodate said peg members in a selective one of said horizontally spaced openings to provide a user-selected proximity adjustment for said hitch assembly relative to the trailer deck.

* * * * *